United States Patent [19]

Nakahara et al.

[11] Patent Number: 4,775,785
[45] Date of Patent: Oct. 4, 1988

[54] PROCESSING APPARATUS FOR A PORTABLE STORAGE MEDIUM

[75] Inventors: Jirou Nakahara, Fujisawa; Shinichi Ishigame, Kawasaki, both of Japan

[73] Assignee: Kabushiki Kaisha Toshiba, Kawasaki, Japan

[21] Appl. No.: 85,202

[22] Filed: Aug. 14, 1987

[30] Foreign Application Priority Data

Aug. 29, 1986 [JP] Japan .................. 61-131358[U]

[51] Int. Cl.⁴ ................................. G06K 7/08
[52] U.S. Cl. .................... 235/449; 235/492
[58] Field of Search ................ 235/449, 492

[56] References Cited

U.S. PATENT DOCUMENTS 4,585,929 4/1986 Brown ........................... 235/449

Primary Examiner—Harold I. Pitts
Attorney, Agent, or Firm—Cushman, Darby & Cushman

[57] ABSTRACT

A processing apparatus for magnetically transmitting data to or from a plurality of types of portable storage media, including a first media having a magnetic stripe thereon, and a second media having a magnetic transducer therein. The apparatus includes a housing, a magnetic head in the housing for interacting with the portable media for transmitting data to or from the media, a groove in the housing for receiving the portable media and longitudinally aligning the magnetic stripe of the first media with the magnetic head of the apparatus, and positioning member for selectively positioning the second media in the groove for transmission of data between the magnetic transducer and the magnetic head.

10 Claims, 5 Drawing Sheets

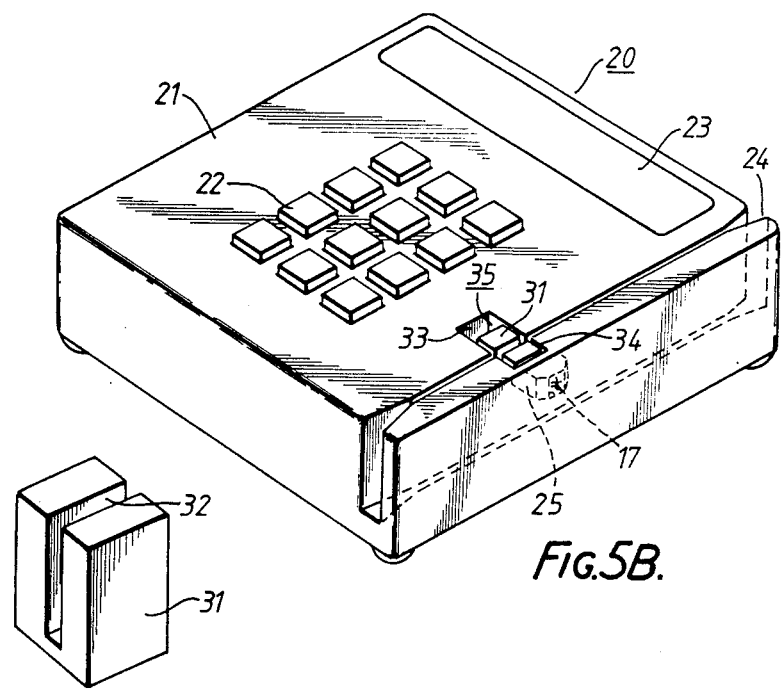
FIG.5B.
FIG.5A.
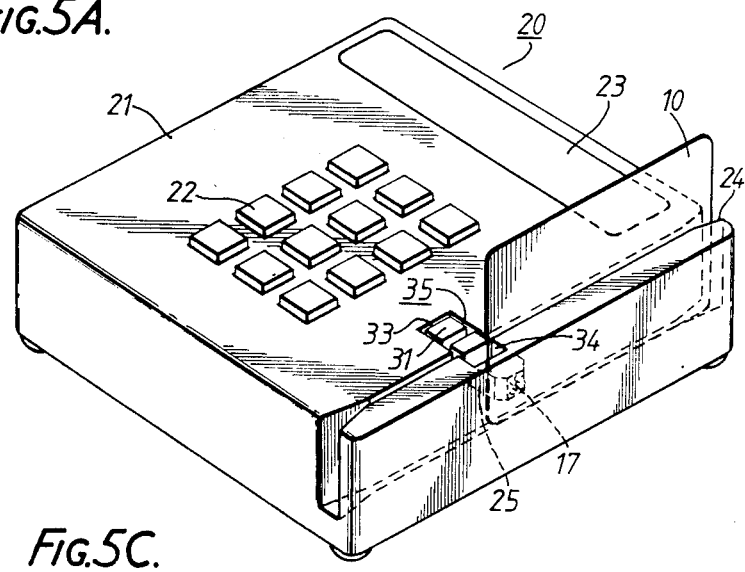
FIG.5C.

PROCESSING APPARATUS FOR A PORTABLE STORAGE MEDIUM

BACKGROUND OF THE INVENTION

1. Field of the invention

The present invention relates to a processing apparatus for using a portable medium wherein data may be written into or read from the portable medium, such as a magnetic card or an IC card.

2. Description of the Related Art

In recent years, bank cards have been widely used as media for transactions in banks. Magnetic cards often are used for these cards. More recently, IC cards, in which micro processors or memories are included, have drwan public attention. In such IC cards, many kinds of data about personal affairs can be stored. The IC cards have a larger memory capacity than that of the magnetic cards and better processing functions. Accordingly, these IC cards potentially can be used as multifunction cards for an extremely wide range of fields, such as bank cards, credit cards, tickets for transportation systems, or employees' identification cards. Therefore, IC cards having multifunctions may be more widely used than magnetic cards, having a single function. However, a read/write apparatus for transmitting or receiving signals through electric oontacts provided on the surface of the IC card is required for use of such an IC card.

A magnetic card read/write apparatus for using magnetic cards now popular in the market is capable of accepting the IC cards. In that case, however, it is necessary to add not only a connecter to connect with electric contacts of the IC cards, but also an electric processing circuit to transmit or receive data through the connecter. To avoid such problems, a magnetic field generating means has been proposed to replace the magnetic stripe of the magnetic cards now being used.

In this case, in order to transmit or receive signals accurately to and from the IC card, it is necessary that the positioned accurately so that the magnetic field generating means in the IC card may magnetically interact with the magnetic head in the magnetic card read/write apparatus. At present, the magnetic card read/write apparatus are equipped to scan the magnetic stripe formed on the magnetic card.

SUMMARY OF THE INVENTION

It is an object of the present invention to provide a processing apparatus for using a portable medium which accurately and simply transmits or receives signals for a portable medium.

According to one aspect of the present invention, there is provided a processing apparatus for magnetically transmitting data to and from a plurality of types of portable storage media, including a first media having a magnetic stripe thereon, and a second media having a magnetic transducer therein, comprising a housing, magnetic input/output means in the housing for interacting with the portable media for transmitting data to and from the media, groove means in the housing for receiving the portable media and longitudinally aligning the magnetic stripe of the first media with the input/output means of the apparatus, and positioning means for selectively positioning the second media in the groove means for transmission of data between the magnetic transducer and the input/output means.

Preferably, the positioning means includes stopper means selectively movable between a first position wherein the portable medium is blocked from movement along the groove means and a second position wherein the portable medium is allowed to move along the groove means.

BRIEF DESCRIPTION OF THE DRAWINGS

These and other objects and advantages of the present invention will become more apparent and more readily appreciated from the following detailed description of the presently preferred exemplary embodiments, taken in conjunction with the accompanying drawing of which:

FIGS. 5A to 5C show a fourth embodiment of the processing apparatus according to the present invention; in which FIG. 5A is an enlarged perspective view of a stopper;

FIG. 5B is a perspective view of the processing apparatus containing the stopper;

FIG. 5C is a perspective view showing the processing apparatus in FIG. 5B in use;

DETAILED DESCRIPTION OF THE PREFERRED EMBODIMENT

The embodiments of the present invention will be described referring to the accompanying drawings.

Figure 1A:
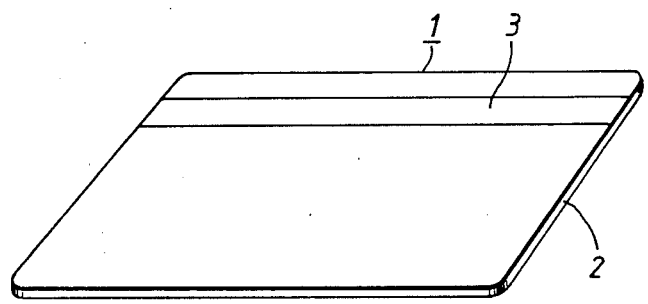
FIG. 1A is a perspective view of a magnetic card to be used with a processing apparatus according to the present invention.

FIG. 1A shows a typical magnetic card 1 such as is now in general use and which may be used with the processing apparatus of the present invention. Magnetic card 1 is made of plastic and is formed with a magnetic stripe 3 extending longitudinally along a card substrate 2 about 5 mm from the edge of card substrate 2. Substrate 2 is about 85×54 mm in size. On magnetic stripe 3, data up to about 72 characters may be recorded magnetically.

Figure 1B:
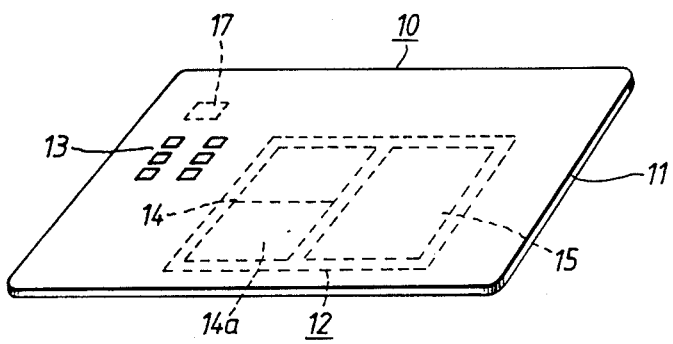
FIG. 1B is a perspective view of an IC card to be used with a processing apparatus according to the present invention.

FIG. 1B shows an IC card 10 to be used with the processing apparatus of the present invention. IC card 10 contains an IC module 12 on a card substrate 11 of about 85×54×0.76 mm in size. IC module 12 is connected electrically with a contactor 13 consisting of plural number of contacts formed on the surface of card substrate 11. IC module 12 comprises a CPU 14 and an EEPROM (Electric Erasable Programmable Read- Only Memory) 15. EEPROM 15 has a capacity for storing data up to about 8,000 characters. CPU 14 is a control element for reading, calculating or memorizing instructions or data being input to the IC card. EEPROM 15 is a non-volatile data memory and may read or write data under the control of CPU 14. Further, CPU 14 includes a RAM (Random Access Memory) portion 14a.

Card substrate 11 is provided with a transducer 17 as a magnetic field generating means embedded in card substrate 11 longitudinally about 5 mm inside from the edge. This transducer 17 comprises a ring-shaped core made of magnetic material and a coil surrounding the ring-shaped core. As an example of a card containing a transducer inside the card, description is given in the U.S. application, Ser. No. 932,521 filed on Nov. 20, 1986 by this applicant. Transducer 17 is electrically connected to IC module 12, and may transmit or receive signals to or from a magnetic head which will be mentioned later. Further, a thin battery (not shown) is housed in IC card 10, and IC module 12 and transducer 17 are driven by the thin battery when a key (not shown) on the surface of the card is operated.

Figure 2:
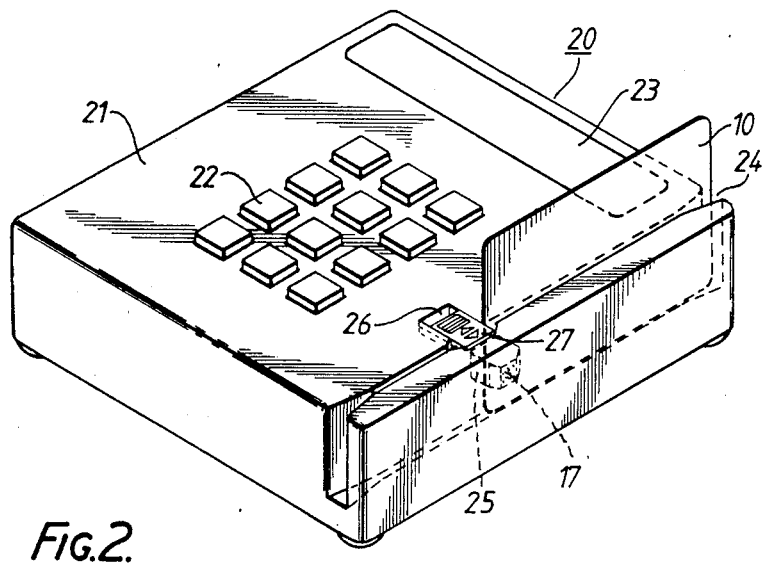
FIG. 2 is a perspective view of a first embodiment of the processing apparatus according to the present invention.

FIG. 2 shows a first embodiment of a processing apparatus to be used for a magnetic card read/write apparatus 20 of the sliding type. The surface of a housing 21 is provided with a keyboard 22 and a display portion 23 displaying various data or information. A sliding groove 24 is formed in one side of housing 21. The magnetic card 1 may slide throughout the total length of the groove 24. A magnetic head 25 is placed in housing 21 facing the sliding groove 24 in the middle of the groove 24. When magnetic card 1 slides along sliding groove 24, magnetic head 25 is positioned so that it may face magnetic stripe 3 on magnetic card 1. A groove-shaped recess 26 is provided on a surface of housing 21 perpendicular to the longitudinal direction of sliding groove 24 and facing the middle part of the sliding groove 24 in the longitudinal direction. In recess 26, a stopper 27 of slender and block shape is movably acommodated. Stopper 27 may be movable between a first position where a card is blocked from slidable movement along sliding groove 24 by the stopper 27 and a second position where the card may slide freely through groove 24. Thus, if stopper 27 is moved to the second position, a magnetic card 1 is movable throughout the total length of sliding groove 24. When stopper 27 is moved to the first position, an IC card 10 is blocked from movement and stopped by stopper 27 extending into sliding groove 24. Stopper 27 is provided so that transducer 17 in IC card 10 may be aligned with magnetic head 25.

Therefore, when a magnetic card 1 is used, stopper 27 is moved to the second position by an operator out of the path of sliding groove 24. Then magnetic card 1 can move throughout the total length of sliding groove 24. While magnetic card 1 is moved along sliding groove 24, data recorded on magnetic stripe 3 can be read by magnetic head 25 or be written on magnetic stripe 3.

On the other hand, when an IC card 10 is used, stopper 27 is moved to the first position by an operator, and stopper 27 extends into sliding groove 24. Thus, IC card 10 is stopped by striking against stopper 27 at its edge in the moving direction in the course of moving along sliding groove 24. At the position where IC card 10 stops, transducer 17 housed in IC card 10 faces magnetic head 25. Accordingly, magnetic head 25 can transmit or receive signals to or from transducer 17. For example, data stored in IC module 12 housed in IC card 10 can be read into housing 21 from magnetic head 25 through transducer 17.

Therefore, according to the first embodiment, IC card 10 can be stopped precisely at the proper position, so that the magnetic field generating means in both magnetic card read/write apparatus 20 and IC card 10 may transmit or receive signals. Accordingly, signals can be accurately transmitted or received.

In the above embodiment, although the stopper 27 blocks one part of sliding groove 24, the invention is not limited to this configuration. It is sufficient that IC card 10 may be stopped at any specified position.

Figure 3:
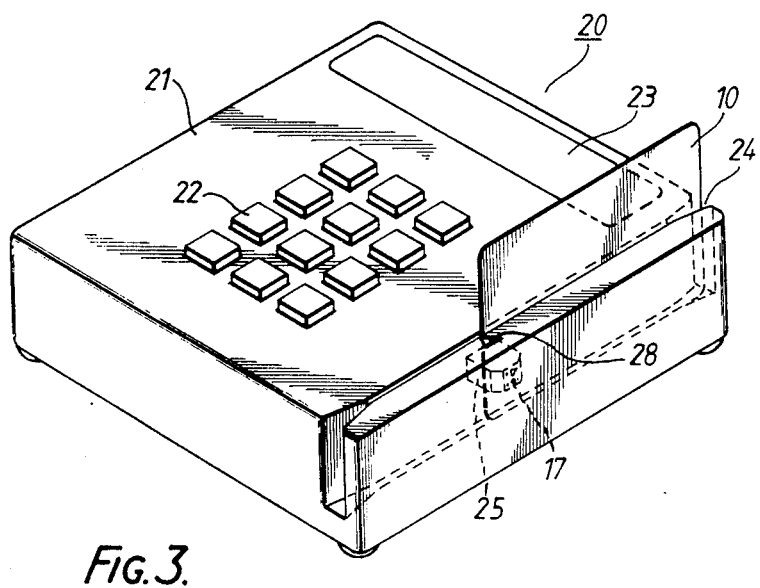
FIG. 3 is a perspective view of a second embodiment of the processing apparatus according to the present invention.

FIG. 3 shows the second embodiment of the present invention. An indicator 28 is provided in such a position that it can be seen on the surface of housing 21 in the middle part of sliding groove 24 in the longitudinal direction. The position of indicator 28 corresponds to a point where the relative position between magnetic head 25 in magnetic card read/write apparatus 20 and transducer 17 in IC card 10 may transmit or receive signals.

Indicator 28 may be engraved into the surface of housing 21, or may be formed by printing or labelling. Therefore, according to the second embodiment, when IC card 10 is used, signals can be transmitted or received by matching the edge of IC card 10 with the position of indicator 28. Thus, accurate transmission or receipt of signals can be achieved by this extremely simple mechanism.

Figure 4:
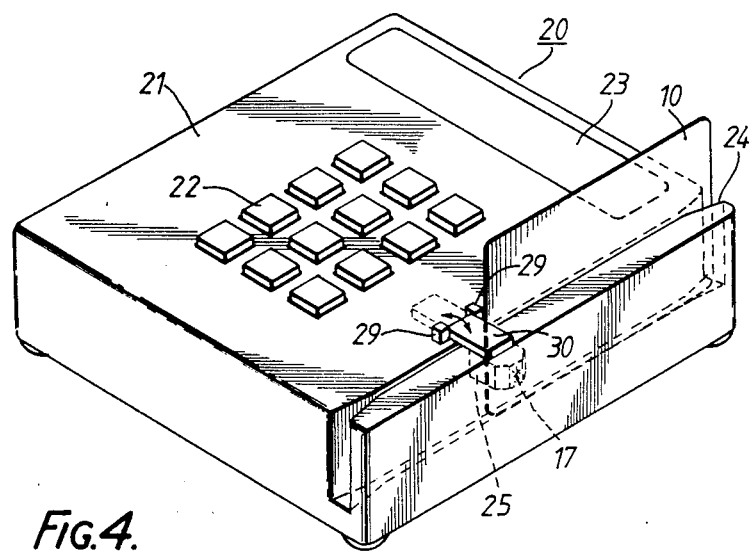
FIG. 4 is a perspective view of a third embodiment of the processing apparatus according to the present invention.

FIG. 4 shows the third embodiment of the present invention. A pair of bearings 29 are provided on the surface of housing 21 positioned in the middle part of sliding groove 24 in the longitudinal direction. A stopper 30 is rotatably provided on bearings 29 through a shaft (not shown). Stopper 30 extends over sliding groove 24 as shown in FIG. 4, and may rotate between a first position where an IC card 10 is intercepted in the course of sliding along sliding groove 24 (as shown with solid lines) and a second position where a magnetic card 1 is not intercepted in the course of moving (as shown with dotted lines).

FIGS. 5A to 5C show a fourth embodiment of the present invention. A stopper 31, as shown in FIG. 5A, is block shaped and has a guide groove 32 throughout its total length at the center. As shown in FIGS. 5B and 5C, in nearly the center of sliding groove 24 in the longitudinal direction, sliding groove 24 has a first recess 33 on one side, and a second recess 34 opposite to the first recess 33 on the other side. First recess 33 is sized for receiving stopper 31 in close fitting relation, and second recess 34 is sized so that only half of stopper 31 can be accommodated. Stopper 31 is slidably movable along a channel 35 formed by first recess 33 and second recess 34. That is, as shown in FIG. 5B, if half of stopper 31 moves across sliding groove 24 so as to fit into second recess 34, guide groove 32 formed in stopper 31 aligns with sliding groove 24 of housing 21. Under this condition, a magnetic card 1 can slide over the whole length of sliding groove 24, and data recorded on magnetic stripe 3 formed on magnetic card 1 can be read by magnetic head 25. As shown in FIG. 5C, if stopper 31 is moved across sliding groove 24 towards first recess 33, blocks part of stopper 31 extends into sliding groove 24 and blocks sliding groove 24. Thus, an IC card 10 may be blocked from movement and stopped at a specified position by stopper 31. At this position, transducer 17 of IC card 10 faces magnetic head 25 of housing 21 and can transmit or receive signals. The fourth embodiment can accomplish the same result as that of the third embodiment. Further, since no part of the magnetic card read/write apparatus extends substantially above its surface, the size of the apparatus can be minimized to produce a neat appearance.

Figure 6:
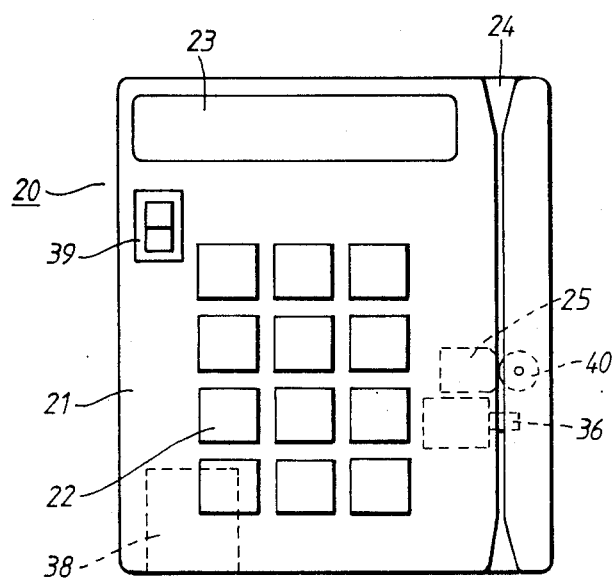
FIG. 6 is a perspective view of a fifth embodiment of the processing apparatus according to the present invention.

FIG. 6 shows the fifth embodiment of the present invention. A rod 36 extended into sliding groove 24 is provided at a position where IC card 10 may be stopped at its edge. Rod 36 is provided on a magnetic solenoid 37 and is moved by operation of magnetic solenoid 37 between a position where rod 36 extends into sliding groove 24 and a position where it is retracted from sliding groove 24. The power supply to magnetic solenoid 37 is controlled by a controller 38 provided in housing 21. Controller 38 is connected electrically with a switch 39 on the upper surface of housing 21. Therefore, when switch 39 is actuated, controller 38 supplies power to solenoid 37 and operates solenoid 37 to make rod 36 extend into sliding groove 24. Opposite the position of magnetic head 25, a press roller 40 is rotatably mounted. Press roller 40 pushes the card towards magnetic head 25 when a magnetic card 1 or an IC card 10 is inserted into sliding groove 24, and makes the card contact securely with magnetic head 25. Therefore, by the simple operation of switch 39, it possible to change selectively between the use of a magnetic card 1 or an IC card 10. The changing operation requires only a push of switch 39.

Figure 7:
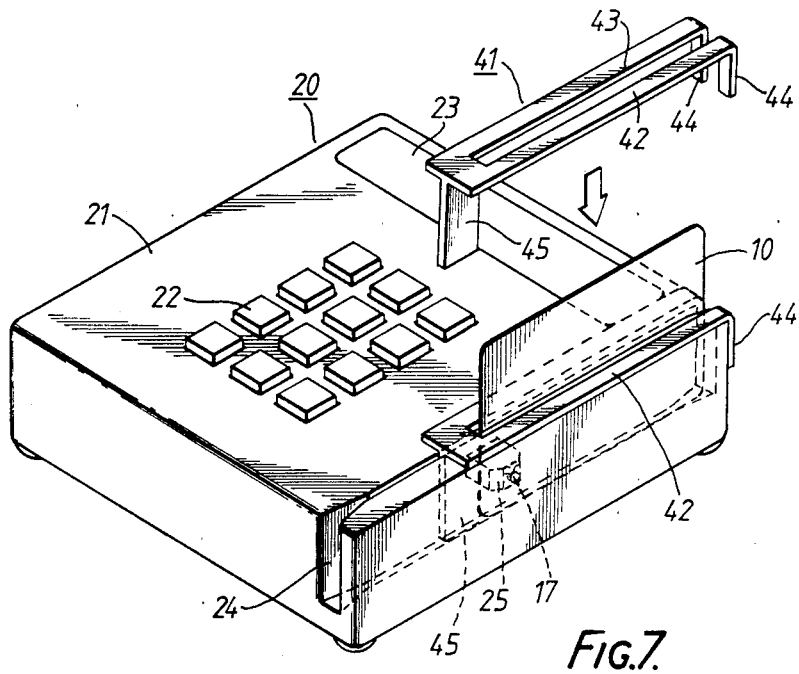
FIG. 7 is a perspective view of a sixth embodiment of the processing apparatus according to the present invention.

FIG. 7 shows a sixth embodiment of the present invention. A stopper 41 is removably mounted on sliding groove 24 of housing 21. Stopper 41 comprises a loading portion 42 in a strip shape, a slit 43 formed from one edge to the other edge in the longitudinal direction, a pair of looking portions 44 extending perpendicular to loading portion 42 on one end of loading portion 42, and a portion 45 positioned at the other side of slit 43 and extending perpendicular from loading portion 42. Extending portion 45 is inserted into sliding groove 24 of housing 21 and locking portion 44 is locked at the end of sliding groove 24 near the entrance thereof. Stopper 41 is mounted in sliding groove 24 by inserting extending portion 45 into sliding groove 24, positioning loading portion 42 on the surface of housing 21 on both sides of sliding groove 24, and resting locking portion 45 on the edge of housing 21 near the entrance of sliding groove 24.

The distance between locking portion 44 and vertical extending portion 45 is fixed so that transducer 17 in IC card 10 may face magnetic head 25 when IC card 10 is inserted into sliding groove 24. Stopper 41 in the sixth embodiment does not require any recess or any bearing on housing 21, as compared with the fifth embodiment. Accordingly, it is possible to operate housing 21 as a reader apparatus for IC cards only by installing stopper 41 on sliding groove 24 of an existing magnetic card read/write apparatus.

Figure 8:
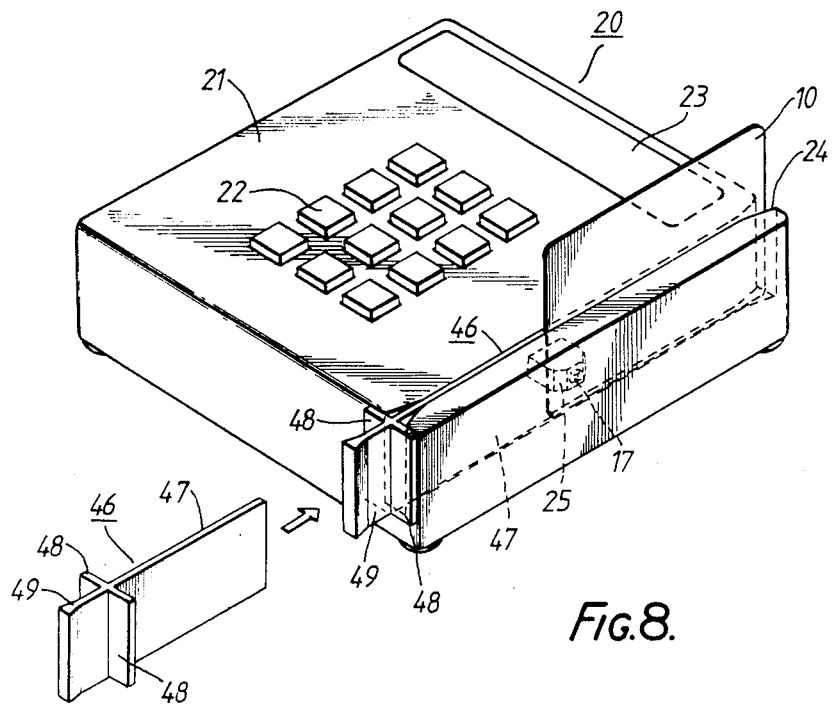
FIG. 8 is a perspective view of a seventh embodiment of a processing apparatus according to the present invention.

FIG. 8 shows a seventh embodiment of the present invention. A stopper 46 is removably mounted in sliding groove 24 of housing 21. Stopper 46 comprises an insertion piece 47 formed in a strip shape, a pair of extension pieces 48 of sword-guard shape extending perpendicularly from this insertion piece 47, and a handle 49 opposite to the insertion piece 47. Handle 49 has many small grooves on its surface to prevent slipping during handling, and is enlarged at its edge for ease of handling. Extension piece 48 contacts the edge of the exit of groove 24. Stopper 46 is fitted into sliding groove 24 by inserting insertion piece 47 until that extension piece 48 contacts the edges of the exit end of sliding groove 24. Accordingly, the leading edge of an IC card 10 inserted into sliding groove 24 strikes against the tip of insertion piece 47. The length of insertion piece 47 is fixed so that transducer 17 in IC card 10 faces magnetic head 25 in housing 21 when IC card 10 is inserted into sliding groove 24.

In the above embodiments, a stopper or a visible indicator is used as a positioning means, but other structures may be used. For example, the stopping position may be indicated by a sound, after a specified position for the sliding IC card is sensed with light sensor.

What is claimed is:

1. A processing apparatus for magnetically transmitting data to or from a plurality of types of portable storage media, including a first media having a magnetic stripe thereon, and a second media having a magnetic transducer therein, comprising:
   a housing;
   magnetic input/output means in the housing for interacting with the portable media for transmitting data to or from the media:
   groove means in the housing for receiving the portable media and longitudinally aligning the magnetic stripe of the first media with the magnetic input/output means of the apparatus; and
   positioning means for selectively positioning the second media in the groove means for transmission of data between the magnetic transducer and the magnetic input/output means.

2. The apparatus of claim 1 wherein the magnetic input/output means of the housing includes a magnetic head positioned for longitudinal alignment with the magnetic stripe of the first medium and the magnetic transducer of the second medium when one of the first and second portable media is received in the groove means.

3. The apparatus of claim 2 wherein the groove means includes a groove having an entrance and an exit for guiding a portable medium being manually moved from the entrance to the exit and for magnetic interaction between the magnetic stripe and tbe magnetic head during the movement of the portable medium.

4. The apparatus of claim 3 wherein the positioning means includes stopper means selectively movable between a first position wherein the portable medium is blocked from movement along the groove and a second position wherein the portable medium is allowed to move along the groove.

5. The apparatus of claim 4 wherein the stopper means includes a block-shaped member slidably mounted for movement between the first position and the second position, and including a guide groove therein for alignment with the groove when the block-shaped member is in the second position.

6. The apparatus of claim 4 wherein the stopper means includes a solenoid and a rod mounted to the solenoid for movement between the first position and the second position.

7. The apparatus of claim 4 wherein the stopper means includes a stopper.member detachably mounted on the groove.

8. The apparatus of claim 7 wherein the stopper member includes a slot for alignment with the groove, and a guide portion for insertion into the groove for blocking movement of the portable medium in the groove.

9. The apparatus of claim 7 wherein the stopper member includes an insertion piece for insertion into the groove for blocking movement of the portable medium in the groove.

10. The apparatus of claim 3 wherein the positioning means includes an indicator visibly positioned on the surface of the housing near the groove.

* * * * *